Patented June 1, 1943

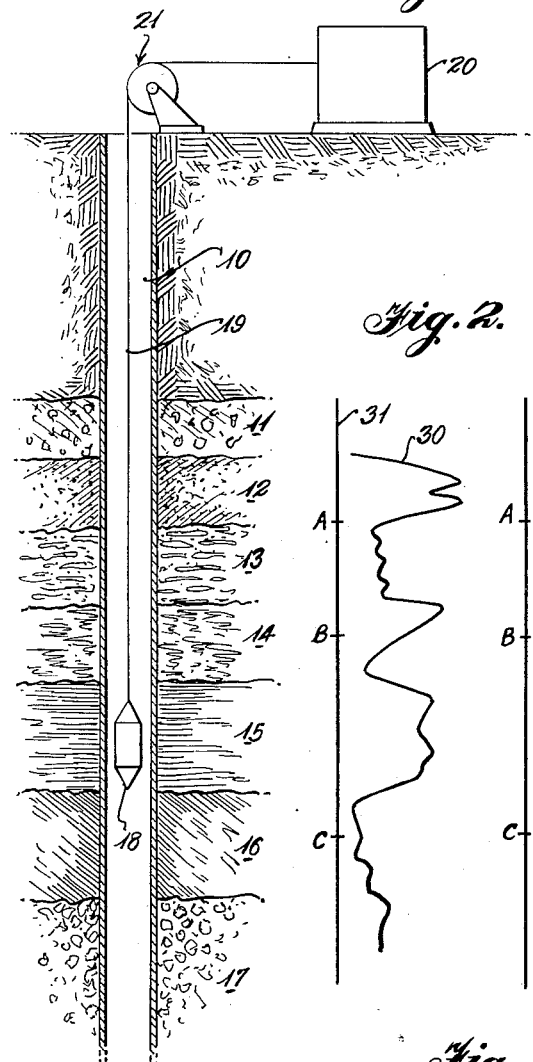

2,320,643

UNITED STATES PATENT OFFICE 2,320,643

WELL SURVEYING METHOD AND APPARATUS

Jacob Neufeld, Tulsa, Okla., assignor to Well Surveys, Incorporated, Tulsa, Okla., a corporation of Delaware Application May 14, 1941, Serial No. 393,495

5 Claims. (Cl. 250—83.6)

This invention relates generally to improvements in methods of geophysical prospecting useful for locating valuable subsurface deposits, particularly strata containing natural gas, petroleum or kindred substances.

It is now well recognized by workers in the field to which this invention relates that the porosity of subsurface geological formations is a factor having significant relation to the presence of deposits of petroleum, natural gas, and the like because of the common occurrence of these deposits in the vicinity of highly porous structures. Methods of prospecting capable of indicating the absolute or relative porosity of subterranean geological formations accordingly are presently the basis of careful intensive study by investigators concerned with the problems presented in location of these deposits.

Porosity measurements may be performed directly by study of samples obtained either from the core during drilling of the well or by use of a sample gun in the well after drilling, or by examination of the well bore with a sensitive instrument capable of detecting variations in a characteristic related to the porosity of the materials being examined.

Representative of the prior art methods of prospecting of this last mentioned type wherein measurements of characteristics related to porosity are performed within a well bore is the measurement, in correlation with depth, of natural potentials created by infiltration of liquids through porous media. This method, while capable of being practiced advantageously in most instances, is not wholly free from disadvantages which limit its more general application. For example in the measurement of natural potentials, discrepancies frequently appear between the true natural potential and the measured or apparent potential, due to polarization of one or both of the measuring electrodes or due to variations in concentration of liquid electrolytes within the well and furthermore, in some instances electro-chemical action causes errors of measurement to interfere with proper determination of the potentials. Another disadvantage inherent in methods of prospecting of this type is that the potentials may be measured only in a well that is at least partially filled with electrolyte, whereas frequently it is desirable to measure the porosity of strata surrounding a dry well. Still another disadvantage is that the presence of a casing in the well makes sampling or the measurement of natural potentials impractical.

Because of these disadvantages if not for other reasons, a need has been experienced by workers in this field for a method of geophysical prospecting that would provide an indication of the porosity or the permeability of subterranean strata in the vicinity of a well bore, applicable with equal advantage both to dry and to liquid filled wells. It is an important object of the instant invention to satisfy this need.

In accordance with the present invention, the porosity or permeability of geological strata is determined by placing discrete quantities of radiation emissive material within the strata to be studied, permitting the material to distribute itself within the strata to a degree related to a significant geological characteristic thereof, and thereafter measuring variations in said characteristic by measurement of emitted radiation. This can be done according to the principles of the present invention in either a cased or an uncased well.

It is to be understood that the method of prospecting according to this invention, while primarily applicable to the study of geological structures surrounding a well bore or the like, may also be adapted in principle by suitable modification, to use in prospecting under other conditions.

Regarded in the limited aspect of its application to studies conducted within a well bore, the novel method of geophysical prospecting according to this invention comprises placing in surrounding strata at different levels within the well bore, which may be either cased or uncased, a plurality of discrete quantities of a radiation-emissive material, permitting the material to become distributed within the strata in a manner related to a significant geological characteristic thereof, and measuring variations in said characteristic by moving a radiation detecting instrument within the well bore.

The apparatus required to provide a physical embodiment of this invention comprises means for placing the radiation emissive material within the locality being studied, and means for logging the locality to determine radiation emission before and after the material has been so placed. A conventional projectile firing well capsule is satisfactory for use in placing the radiation emissive material within the geological strata in most instances although special conditions may sometimes make the use of a specifically designed device preferable. Instruments of this type, which are commonly used for the taking of samples from geological strata surrounding a well bore, can be adapted for use in the practice of this invention by replacement of the ordinary sampling or casing-perforator projectiles with special projectiles containing a suitable radiation emissive material. The material is retained within the projectile in a manner such that after firing and penetration of the projectile into the selected strata, the material is released for distribution throughout the neighboring locality to a degree proportionally related to a significant geological characteristic thereof. A special projectile of this type can comprise a relatively indestructible cup-shaped body opening in the direction of its intended travel, normally closed by a cover capable of being readily disintegrated or destroyed at the time of firing or shortly thereafter. For example, the closing cover may be frangible so that it will be broken by the firing of a gun, or soluble, so that it will, in a short time be dissolved by the contents of the bullet. Acid may be added to the bullet contents for the purpose of expediting the dissolving of the cover.

A conventional type of radiation-detecting means such as is used in radioactivity well logging is satisfactory for use in the practice of this invention. It will be understood that the specific type of instrument to be employed is dependent to a degree upon the conditions of use, for example upon the character of the radiation emitted by the material contained in the projectile with which the instrument is used. In those instances wherein the emitted radiation comprises to a major degree radiation having a frequency characteristic corresponding to that of gamma rays, the radiation detecting means can consist of a Geiger-Müller counter or high pressure ionization chamber associated with suitable amplifying signal transmitting, signal receiving and recording equipment. In instances where the radiation consists of streams of particles of nuclear dimensions such as neutrons, deuterons, etc., an appropriate detecting means can be substituted for the Geiger-Müller counter. Neutrons can be readily detected by use of an ionization chamber provided with a mass of boron, silicon or the like which reacts with the neutrons to cause ionization within the chamber.

The source of the radiations may be either a naturally radioactive material or a material that has been made radioactive by artificial means. As examples of naturally radioactive substances, mesothorium, radiothorium, protoactinium and actinium may be mentioned. Any other naturally radioactive material may be used or a mixture of radioactive materials may be used. Furthermore, the material used does not have to be entirely composed of radioactive material. For example, ores containing radioactive material may be used or a mixture of radon and nitrogen may be used.

As examples of artificially produced radioactive substances mention may be made of the materials produced in accordance with the processes disclosed in United States Letters Patent No. 2,206,634 granted July 2, 1940, to Fermi et al. However, the present process is not limited to the use of artificially radioactive material produced by the processes disclosed in this patent but may be accomplished with any artificially produced radioactive substance regardless of how it is produced. Many elements upon being exposed to slow neutrons, fast deuterons or other conditions that will cause nuclear reactions to take place will thereafter be radioactive and any of these materials may be used.

A suitable neutron source can comprise a mixture of radon and beryllium, polonium and beryllium, or a mass of beryllium under bombardment by particles of nuclear dimensions artificially accelerated as by use of cyclotron. These radiation-emissive materials can be used in dissolved or suspended condition, or in the case of radon, as a gas.

In order to promote a better understanding of this invention and of how the principles of the same may be applied to well logging, a typical procedure and suitable apparatus will hereinafter be described, it being understood, however, that the description is provided by way of example of the practice of the invention and shall not be construed as a limitation thereof.

In the accompanying drawing:

Figure 1 is a diagrammatic vertical sectional view of a well bore and neighboring strata;

Figure 2 is a well log showing intensity of natural radiation;

Figure 3 is a corresponding well log made shortly after introduction of foreign radiation-emissive material to the strata adjacent the well;

Figure 4 is a well log similar to that shown in Figure 3 but made later after distribution of the material had taken place; and Figure 5 is a longitudinal sectional view of a projectile suitable for use in the practice of this invention.

In Figure 1 of the drawing, a cased well bore 10 is illustrated passing through subterranean strata 11, 12, 13, 14, 15, 16 and 17, said strata being of different geological characteristics. A logging instrument 18, suspended upon a cable 19, is positioned within the well for detecting radiation emitted from surrounding geological formations. As is conventional in devices of this nature, radiation from the strata causes a signal to be transmitted from the instrument 18 to analyzing and recording equipment 20 located on the surface, whereby a log of radiation emission correlated with depth measurement is obtained. The logging instrument 18 is moved within the well by a suitable winch mechanism generally indicated by the reference character 21.

In Figure 2 of the drawing a radiation well log is illustrated wherein the distance from the curve 30 to the norm line 31 is proportionally related to the intensity of radiation emanating from the corresponding stratum at a selected location. Examination of the curve 30 indicates that information concerning the porosity of the geological formations corresponding to the depths A, B and C would be desirable.

To secure this further information concerning the strata at the selected levels, a projectile firing device is substituted in lieu of the detecting instrument 18 and moved within the well bore to the proper depths for operation. The projectile firing device is provided with one or more projectiles each comprising a readily destructible envelope containing radiation emissive material. A projectile of this type is illustrated in Figure 5 and comprises a cup-like member 33 having an open end 33a facing in its direction of intended travel, provided with an easily destructible closure 34 which seals the cavity 35 within the element 33 except after the projectile has been fired into a geological formation. Natural or artificially prepared radiation-emissive material 36 is retained within the cavity 35 of the closure 34, under conditions such that when the closure is broken or destroyed, the material will be discharged from the cavity and will permeate the geological structure into which the projectile has been fired.

Figure 3 depicts a radiation well log made within a short time interval after firing projectiles containing radiation emissive materials into the geological strata surrounding well bore at the depths A, B and C. It is to be noted that the curve 38 now includes three readily discernible peaks 39, 40 and 41 which did not appear in the curve 30 and which are caused by the presence of the artificially introduced radiation emissive material in the strata being studied.

In Figure 4 a radiation well log is illustrated corresponding to the logs appearing in Figures 2 and 3 but made an appreciable time subsequent to the placement of radiation emissive material within the strata. It is to be noticed that in this log there is a peak 43 which corresponds both in width and height to the peak 39 of the curve 38 in Figure 3. Peak 44 however, which corresponds with the peak 40 of the curve 38, is noticeably wider than in the earlier log, thus indicating distribution of the radiation emissive material within the stratum 14. The peak 45 which corresponds to the peak 41 of the curve 38, is even wider thus indicating relatively wide distribution of radiation emissive material placed in the stratum 16. Interpretation of the curve 42 in the light of the other curves reveals that the porosity of the stratum at the level C exceeds the porosity of the stratum at the level B, which in turn exceeds that of the stratum at the level A.

Inasmuch as it is usually desirable to avoid altering permanently the radiation emissive characteristics of subterranean strata in the vicinity of a well bore, it is desirable to use natural or artificially radiation emissive contaminants having a relatively short effective life, thus freely permitting subsequent logging of natural radiation emission after a time interval corresponding to the life of the material used.

In some instances it is desirable to measure qualities ther than porosity of subterranean strata and to these purposes the principles of the present invention may be applied with advantage. For example, the relative hardness of selected strata may be of interest and this characteristic can be determined by firing projectiles containing equal quantities of radiation emissive material into the several strata of interest, and thereafter measuring the height of the peaks in a radiation well log as an indication of the distance traveled by the projectile from the axis of the bore. If it is desired to obtain measurements of this nature while determining porosity in accordance with the teachings of the present invention, the above described procedure is followed and additionally a radiation log is obtained substantially immediately after firing of the projectiles into the strata. The additional log corresponds to the log appearing in Figure 3 of the drawing and by comparing the height of the peaks, a determination of relative hardness or permeability may be made. The distribution of radiation emissive material from the projectiles may thereafter be measured as has been above described, thereby indicating relative porosities of the strata.

Other adaptations and modifications of the principles of this invention permitting solution of problems in geophysical prospecting will suggest themselves to those skilled in this art and are comprehended within the scope of the subjoined claims.

I claim:

1. Method of geophysical prospecting that comprises placing quantities of radiation-emitting material within a frangible envelope at selected locations within the locality being studied, permitting the material to distribute itself within the locality in a manner related to a significant geological characteristic thereof, and detecting variations in said characteristics by measuring radiation in said locality.

2. Method of geophysical prospecting that comprises placing, at different levels, a plurality of discrete quantities of radioactive material within a frangible envelope in geological strata surrounding a well bore; permitting said material to distribute itself within the strata in a manner related to a significant geological characteristic thereof; and detecting, within the well bore, variations in said characteristic by a radioactivity well logging method.

3. Method of geophysical prospecting that comprises logging a well to obtain a first record of natural radiation emission of subterranean strata correlated with depth; introducing into adjacent strata at selected depths within the well, quantities of radiation-emitting material within a frangible envelope; permitting the material to distribute itself within the strata in a manner related to a significant geological characteristic thereof; and logging the well to obtain a second record of radiation emission correlated with depth.

4. Method of geophysical prospecting that comprises obtaining a first well log of radiation emanating from subterranean strata correlated with measurements of depth, thereafter firing projectiles containing radiation-emissive material into selected strata, permitting the material to distribute itself within the strata in accordance with a geophysical characteristic thereof, obtaining a second well log of radiation emanating from the strata correlated with depth, and detecting variations in said geophysical characteristic by comparison of the first and second logs.

5. Method of geophysical prospecting that comprises obtaining a first well log of subterranean radio-activity in the locality being studied, thereafter firing projectiles containing radioactive material into selected subterranean strata, permitting the material to permeate the strata in accordance with a geophysical characteristic thereof, obtaining a second well log of radio-activity of the subterranean strata, and detecting variations in said geophysical characteristic by comparison of the first and second logs.

JACOB NEUFELD.